(12) United States Patent
Gross

(10) Patent No.: US 8,360,335 B2
(45) Date of Patent: Jan. 29, 2013

(54) VALVES AND METHODS FOR REGULATING THE FLOW RATE OF A LIQUID TO A FIXTURE

(75) Inventor: Lloyd A. Gross, Radnor, PA (US)

(73) Assignee: Lloyd A. Gross, Radnor, PA (US)

( * ) Notice: Subject to any disclaimer, the term of this patent is extended or adjusted under 35 U.S.C. 154(b) by 765 days.

(21) Appl. No.: 12/465,480

(22) Filed: May 13, 2009

(65) Prior Publication Data

US 2009/0308459 A1   Dec. 17, 2009

Related U.S. Application Data

(60) Provisional application No. 61/053,201, filed on May 14, 2008.

(51) Int. Cl.
*F16K 17/38* (2006.01)
*G05D 23/08* (2006.01)
*E03B 1/00* (2006.01)

(52) U.S. Cl. .......... 236/93 B; 236/93 R; 137/2; 137/468

(58) Field of Classification Search .............. 236/93 B, 236/93 R, 93 A, 48 R, 99 K, 99 J; 137/2, 137/468; 251/234

See application file for complete search history.

(56) References Cited

U.S. PATENT DOCUMENTS

| | | | |
|---|---|---|---|
| 3,368,758 A * | 2/1968 | Fraser ..................... | 236/93 R |
| 4,262,844 A * | 4/1981 | Sekiya ..................... | 236/48 R |
| 5,878,949 A * | 3/1999 | Matsui et al. ............. | 236/93 R |
| 2006/0196952 A1* | 9/2006 | Willsford et al. .......... | 236/12.15 |

* cited by examiner

*Primary Examiner* — Chen Wen Jiang
(74) *Attorney, Agent, or Firm* — Fox Rothschild LLP

(57) ABSTRACT

Embodiments of valves permit liquids such as water to flow therethrough at a relatively high flow rate when the temperature of the water is below a predetermined level. The valves reduce the flow rate when the temperature of the water is at or above the predetermined level. The valves can thus facilitate purging of cold water from the hot-water supply piping upstream of the valves at a relatively fast rate, while reducing the flow rate of the water once the water reaching the valves has warmed to a comfortable level.

26 Claims, 7 Drawing Sheets

VALVES AND METHODS FOR REGULATING THE FLOW RATE OF A LIQUID TO A FIXTURE

CROSS-REFERENCE TO RELATED APPLICATIONS

This application claims the benefit under 35 U.S.C. §119(e) of U.S. Provisional Application No. 61/053,201, filed May 14, 2008, the contents of which are incorporated by reference herein in their entirety.

TECHNICAL FIELD

The present invention relates to valves and methods for regulating the flow rate of a liquid such as water to fixtures such as showerheads and faucets based on the temperature of the liquid.

BACKGROUND

Fixtures such as shower heads are normally supplied with hot water by way of piping located between the shower head and a hot water source such as a water heater. The hot water that remains in the piping when the flow to the shower head is stopped normally cools over time. The piping itself also cools once the flow of hot water therethrough has stopped.

The presence of the relatively cold water in the hot water supply pipe causes a delay between the time at which flow to the shower head is re-started, and the time at which warm water begins to flow from the shower head. The relatively cold water needs to be purged from the hot water supply pipe, and the temperature of the pipe may need to be increased, before warm water can reach the shower head.

The time required to purge the cold water from the hot water supply pipe and warm the pipe is dependent upon the overall length of the pipe, and the flow rate through the shower head. In particular, the required time increases with the overall length of the hot water supply pipe. The required time also increases as the flow rate through the shower head decreases.

A current trend in new-home construction is to deliver hot water from the water heater to multiple fixtures in multiple rooms using a single run of piping with individual branches emanating therefrom. The use of a single piping run to service multiple rooms can reduce the overall amount of copper piping needed to construct the house. This arrangement, however, can increase the volume of water between the water heater and some of the fixtures, and can thereby increase the volume of cold water that needs to be purged from the piping, and the amount of piping that needs to be warmed, before warm water can be delivered to the fixtures. Another trend is the construction of larger houses, which in general can increase the distance that water from the water heater needs to travel before reaching any specific fixture or outlet.

A further trend in new-home construction is the use of low-flow shower heads and other fixtures that limit the flow of water therethrough to relatively low levels, e.g., 2.2 gpm (gallons per minute) at 80 pounds per square inch (psi) pressure, to conserve water. The low flow rate through such fixtures tends to increase the time needed to purge cold water from the hot water supply pipe and warm the pipe after the flow to the fixture has commenced.

The use of long piping runs, low flow rate fixtures, and other factors can thus increase the delay between the time at which a shower or other water source is turned on, and the point at which the water flowing from the source reaches a comfortable level. In some cases, the delay can be excessive, and can represent a substantial inconvenience to the user.

SUMMARY

Embodiments of valves permit liquids such as water to flow therethrough at a relatively high flow rate when the temperature of the water is below a predetermined level. The valves reduce the flow rate when the temperature of the water is at or above the predetermined level. The valves can thus facilitate purging of cold water from the hot-water supply piping upstream of the valves at a relatively fast rate, while reducing the flow rate of the water once the water reaching the valves has warmed to a comfortable level.

Embodiments of valves comprise a housing defining a flow path for a liquid. The housing has a first and a second hole formed therein. The first and second holes form part of the flow path. The valves also comprise a plug movable in relation to the housing between a first position in which the plug blocks the first hole and a second position in which the plug does not block the first hole. The valves also comprise an actuator that moves the plug from the second position to the first position when the temperature of the fluid is at or above a predetermined level.

Embodiments of valves for regulating the flow rate of a liquid to a fixture between a first flow rate suitable for operating the fixture, and a second flow rate higher than the first flow rate are provided. The valves comprise a housing having a first and a second flow path for the liquid formed therein. The flow rate of the liquid through the first flow path is equal to the first flow rate, and the combined flow rate of the liquid through the first and second flow paths is equal to the second flow rate. The valves also comprise a blocking member movable between a first position wherein the blocking member prevents substantial flow through the second flow path, and a second position. The valves further comprise an actuator that moves the blocking member from the second position to the first position in response to changes in the temperature of the liquid.

Methods comprise providing a valve in fluid communication with (i) a fixture, (ii) a source of heated water for the fixture, and (iii) piping that forms a flow path between the source of heated water and the fixture. The valves permit water to pass therethrough at a first flow rate when the temperature of the water is below a predetermined value, and the valves limit the flow rate of the water therethrough to a second flow rate when the temperature of the water is at or above the predetermined value. The second flow rate is less than the first flow rate and is suitable for operating the fixture. The methods further comprise flowing water through the valve, the piping, and the fixture.

Other methods comprise providing a valve in fluid communication with a source of heated water and a fixture. The valve has a first and a second flow path formed therein. The methods also comprise flowing water through the first and second flow paths when the temperature of the water is below a predetermined value. The methods further comprise flowing water through the first flow path and not the second flow path at a flow rate sufficient for operating the fixture when the temperature of the water is at or above the predetermined value.

BRIEF DESCRIPTION OF THE DRAWINGS

The foregoing summary, as well as the following detailed description of preferred embodiments, are better understood when read in conjunction with the appended drawings. The drawings are presented for illustrative purposes only, and the scope of the appended claims is not limited to the specific embodiments shown in the drawings. In the drawings:

DETAILED DESCRIPTION

Figure 2:
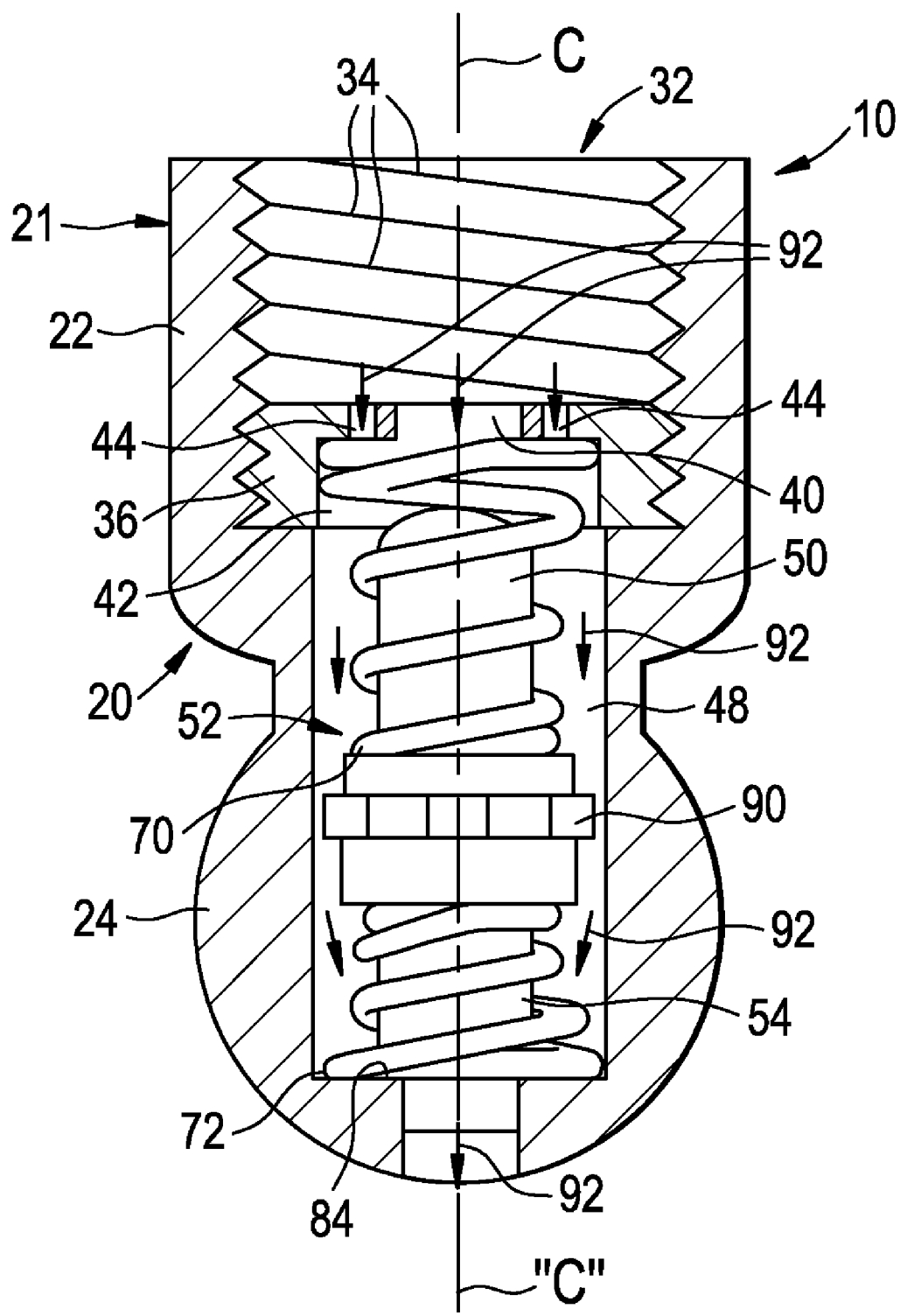
FIG. 2 is a longitudinal cross-sectional view of the valve shown in FIG. 1, taken through the line "A-A" of FIG. 1 and depicting a plug of the valve in its lower position.
Figure 3:
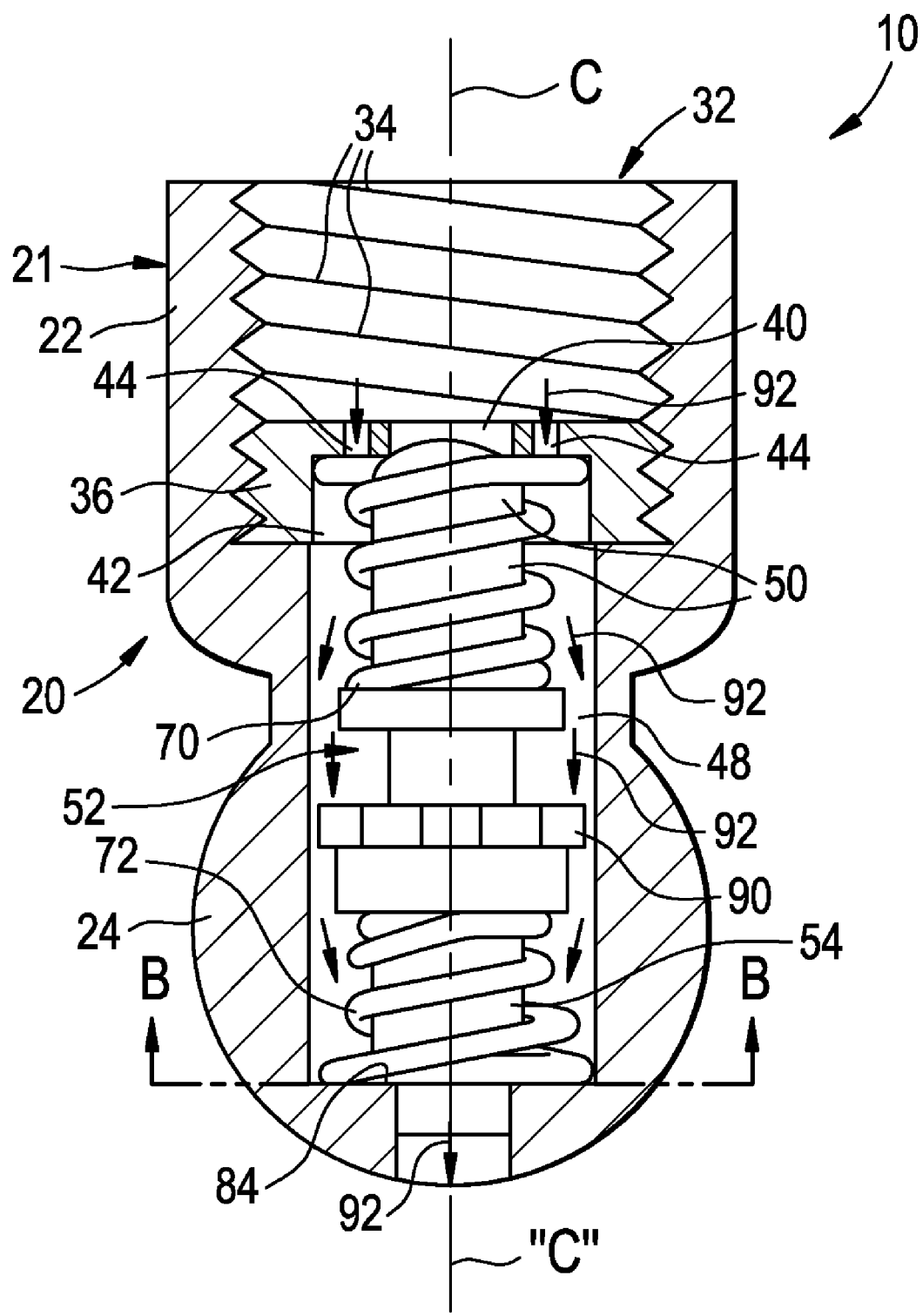
FIG. 3 is a longitudinal cross-sectional view of the valve shown in FIGS. 1 and 2, taken through the line "A-A" of FIG. 1 and depicting the plug of the valve in its upper position.
Figure 4:
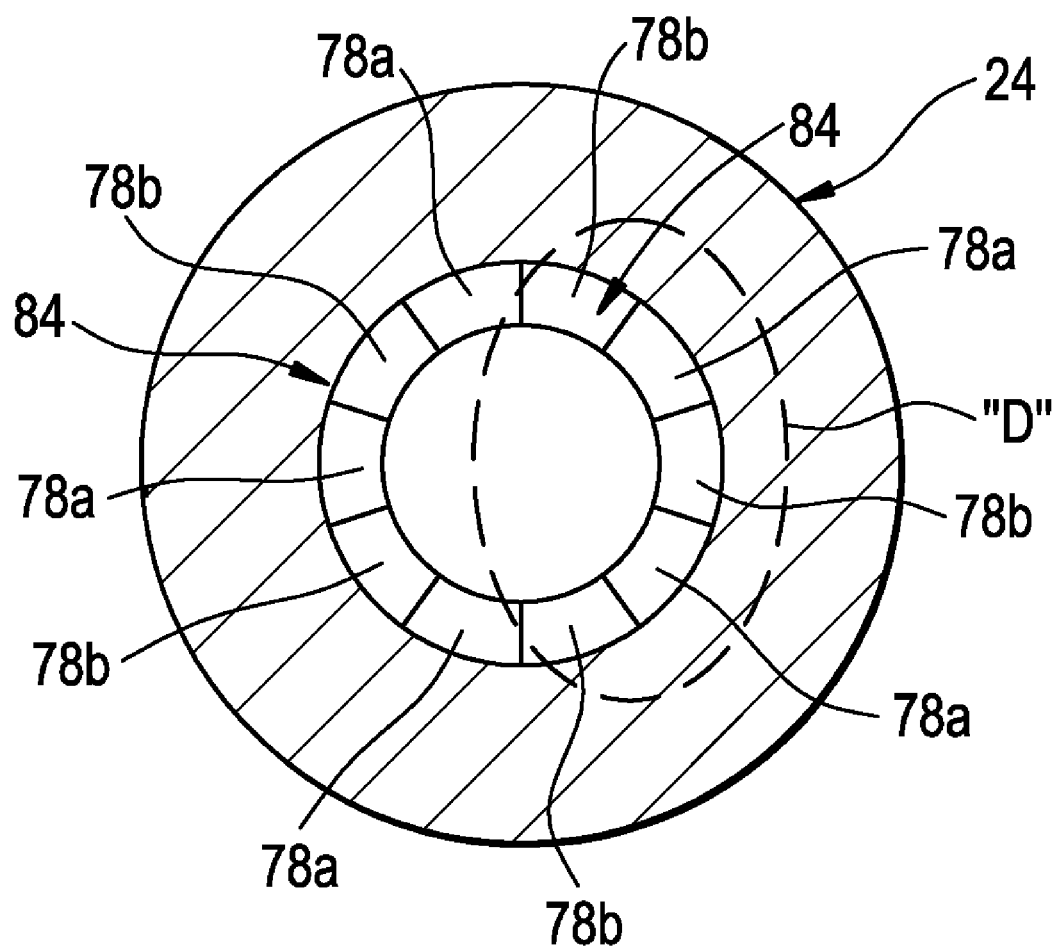
FIG. 4 is a transverse cross-sectional view of the valve shown in FIGS. 1 and 2, taken through the line "B-B" of FIG. 3.

FIGS. 1-9 depict an embodiment of a valve 10. The valve 10 can used to regulate the flow rate of water through a fixture such as a shower head 100 of a residential shower 102, based on the temperature of the water. The shower 102 is depicted schematically in FIG. 9. The shower 102 also includes a water supply pipe 104 that supplies water to the upstream side of the valve 10, and a mixing valve 106, as shown in FIG. 4. The mixing valve 106 mixes water from a hot water supply pipe 108 and a cold water supply pipe 110. The mixing valve 106 also permits the flow of water to the water supply pipe 104 to be started and stopped by the user. Heated water is supplied to the hot water supply pipe 108 from a water heater 112.

Specific details of the shower 102 are presented for exemplary purposes only. The valve 10 can be used in applications other than residential showers such as the shower 102. For example, the valve 10 can be used to regulate the flow rate of water and other fluids through fixtures such as sink and laundry tub faucets. Moreover, the valve 10 can be used to regulate the flow rate of water and other fluids through hand-held shower heads.

The valve 10 permits water to pass therethrough at a first, relatively high flow rate when the temperature of the water is less than a predetermined value. The valve 10 begins to limit the flow rate of the water to a second, relatively low flow rate when the temperature is about equal to or greater than the predetermined value. The respective first and second flow rates can be, for example, about 4-5 gpm and about 2.2 gpm at an inlet pressure of about 80 psi. Specific values for the first and second flow rates are disclosed for exemplary purposes only; the valve 10 can be configured to operate at other flow rates tailored for the specific applications in which the valve 10 is to be used. The predetermined temperature at about which the flow rate starts to change between its first and second values can be, for example, about 80° F.

The valve 10 can be used, for example, to help minimize the delay between the time at which the shower 102 is turned on, i.e., the time at which water flow to the shower head 100 is commenced, and the time at which warm water comfortable for use begins to flow from the shower head 100. In particular, the water within the hot water supply pipe 108 normally cools when the shower 102 is not in use. The valve 10, by permitting cold water to flow through the shower head 100 at a relatively high flow rate, can help to minimize the amount of time needed to purge the cold water from the hot water supply pipe 108 after the shower 102 is turned on. The valve 10 can then regulate the flow rate to the lower exemplary value of 2.2 gallons per minute once the temperature of the water reaching the valve 10 has risen to a comfortable level suitable for showering.

It should be noted that the 80° F. value at which the flow rate through the valve 10 begins to transition downwardly does not necessarily correspond to the water temperature at which the user will shower in the shower 102. The 80° F. transition temperature is selected because, by the time the temperature of the water reaching the valve 10 has warmed this value, most or all of the cold water initially residing in the hot water supply pipe 108 has most likely been purged, and the temperature of the water reaching the valve 10 will increase relatively quickly as the hot water supply pipe 108 is warmed by the relatively hot water passing therethrough. Moreover, the use of 80° F. as the transition temperature is specified for exemplary purposes only; the valve 10 can be configured to transition at other temperatures in the alternative.

Figure 1:
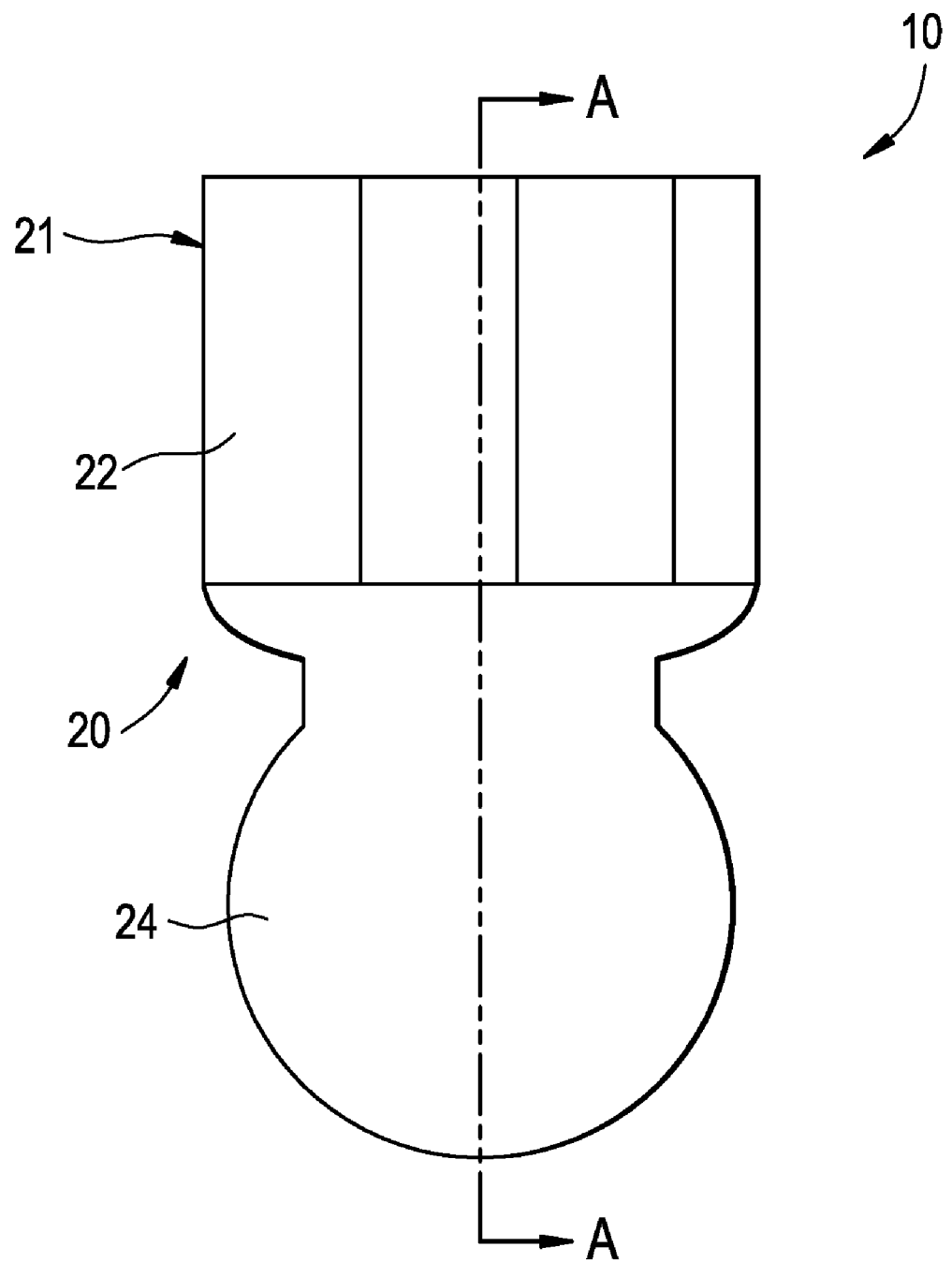
FIG. 1 is a side view of an embodiment of a valve for regulating the flow of a liquid through a fixture.

The valve 10 comprises a housing 20, as shown in FIGS. 1 and 2. The housing 20 includes a body 21 having a first portion 22, and an adjoining second portion 24. The first portion 22 can be mounted on the water supply pipe 104. The outer perimeter of the first portion 22 can be hexagonally shaped as shown in FIG. 1, so that the valve 10 can be grasped by a wrench or other suitable means as the valve 10 is mounted on the water supply pipe 104.

The shower head 100 can be mounted on the second portion 24. The second portion 24 can be substantially ball shaped as shown in FIGS. 1 and 2, so that the second portion 24 can act as a ball joint that permits the shower head 100 to swivel in relation to the valve 10. The housing 20 can have a shape other than that described herein in alternative embodiments.

The first portion 22 of the body 21 has a cavity 32 formed therein, as shown in FIGS. 1 and 2. The first portion 22 includes threads 34 formed along the periphery of the cavity 32. The threads 34 engage complementary threads on the water supply pipe 104 to secure the valve 10 to the water supply pipe 104.

The housing 20 also includes a cap 36. The cap 36 is disposed in the lower portion of the cavity 32, below the water supply pipe 104. The outer peripheral surface of the cap 36 includes threads that engage the threads 34 on the first portion 22 of the body 21, to secure the cap 36 to the first portion 22.

The cap 36 has a substantially circular first hole 40 and an adjoining cavity 42 formed therein, as shown in FIGS. 1-3. The hole 40 and the cavity 42 are each disposed about the centerline "C" of the valve 10.

The cap 36 also has a plurality of second holes 44 formed therein. The second holes 44 are positioned radially outward of the first hole 40, as shown in FIG. 3. Each of the second holes 44 adjoins the cavity 42. The cap 36 is depicted with eight of the second holes 44 for exemplary purposes only. The optimal number of second holes 44 is application-dependent, and can vary with factors such as the desired flow-rate of water thorough the valve 10 when the first hole 40 is blocked.

The first hole 40 and the second holes 44 receive water from the water supply pipe 104. The valve 10 is configured so that water flows through the first hole 40 and the second holes 44 when the water temperature is below the predetermined level. The first hole 40 is blocked when the temperature of the water is about equal to or greater than the predetermined level so that water flows through the second holes 44 only, thereby limiting the flow rate of water through the valve 10.

The second holes 44 can be sized so that the aggregate flow therethrough is about equal to the desired flow rate through the shower head 100 under normal operating conditions. For example, many low-flow shower heads currently on the market operate at a flow rate of about 2.2 gpm. The second holes 44 of the valve 10 can be sized to provide an aggregate flow rate of about 2.2 gpm, so that the valve 10 provides the shower head 100 with about 2.2 gpm when the water temperature has warmed to a level suitable for showering. A higher flow rate of about 4-5 gpm can be can be provided while relatively cold water is flowing thorough the valve 10, so that relatively cold water residing in the hot water supply pipe 108 can be purged more quickly than would be possible at the more restrictive 2.2 pm flow rate.

The second portion 24 of the body has a cavity 48 formed therein. The cavity 48 adjoins the cavity 42 of the first portion 22 of the body 21, as shown in FIGS. 1 and 2.

The valve 10 further comprises a blocking member in the form of a plug 50. The valve 10 also comprises thermal valve or temperature-sensitive actuator 52.

The actuator 52 and the plug 50 are positioned substantially within the cavity 48. The actuator 52 causes the plug 50 to move vertically between a first, or upper, position shown in FIGS. 3 and 6, and a second, or lower, position shown in FIGS. 2 and 5, in response to changes in the temperature of the water flowing through the valve 10. The plug 50 blocks the flow of water through the first hole 40 in the cap 36 when the plug 50 is in its upper position. The temperature-dependent movement of the plug 50 between its upper and lower positions thereby regulates the flow rate of water through the valve 10.

Directional terms such as vertical, horizontal, upwardly, downwardly, above, below, etc. are used with reference to the component orientations depicted in FIGS. 1-3. These terms are used for illustrative purposes only, and are not intended to limit the scope of the appended claims.

The plug 50 can be formed from a relatively soft material such as plastic, to facilitate a substantially water-tight seal between the plug 50 and the cap 36 when the plug 50 is in its upper position. The use of the plug 50 as the blocking member of the valve 10 is disclosed for exemplary purposes only. Other types of blocking members, such as a plate or ball, can be used in the alternative.

Figure 5:
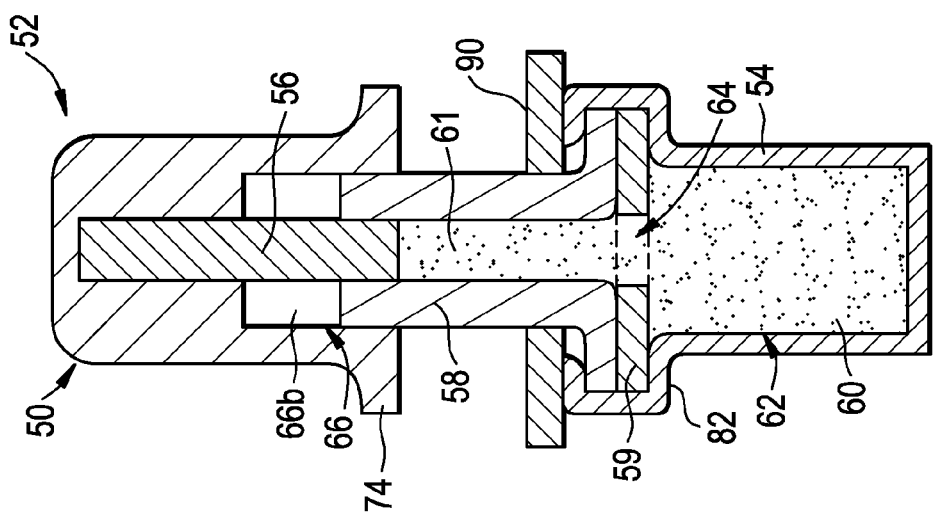
FIG. 5 is a longitudinal cross-sectional view of an actuator and the plug of the valve shown in FIGS. 1-4, depicting the plug and a piston of the actuator in their respective lower positions.
Figure 6:
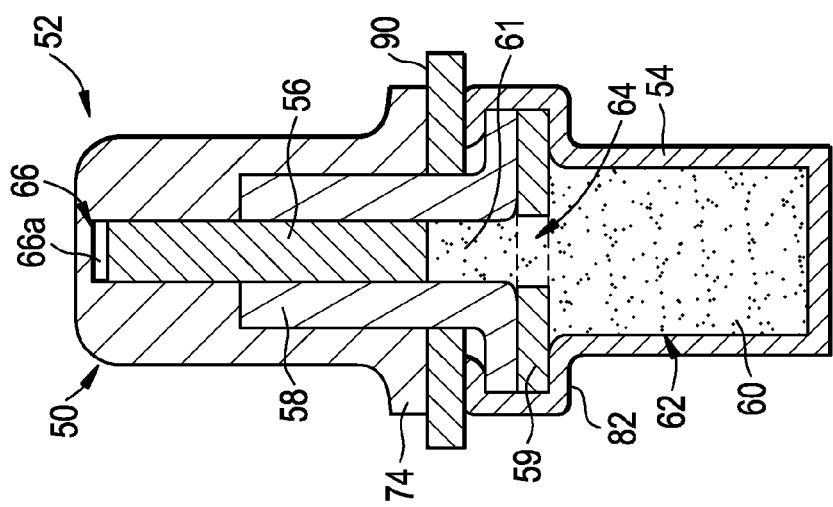
FIG. 6 is a longitudinal cross-sectional view of the actuator and the plug shown in FIG. 5, depicting the plug and the piston in their respective upper positions.

The actuator 52 can comprise, for example, a cylinder 54, a piston 56, a piston housing 58, a spacer plate 59, and a temperature-sensitive wax 60 as shown in FIGS. 5 and 6. The spacer plate 59 and a lower end of the piston housing 58 are positioned within an upper end of the cylinder 54 as shown in FIGS. 5 and 6, so that the piston housing 58 is fixed in relation to the cylinder 54. The piston 56 is positioned within a centrally-located passage 61 formed within the piston housing 58, so that the piston 56 can slide upwardly and downwardly within the passage 61.

The cylinder 54 and the spacer plate 59 define a cavity 62. The spacer plate 59 has an opening 64 formed therein. The opening 64 permits the temperature-sensitive wax 60 to migrate between the cavity 62 and the passage 61.

The plug 50 is mounted on an upper end of the piston housing 58, as shown in FIGS. 5 and 6. In particular, the plug 50 has a cavity 66 formed therein. The cavity 66 has a first, or upper, portion 66a and a second, or lower, portion 66b. The lower portion 66b is sized to receive the upper end of the piston housing 58, so that the plug 50 can slide upwardly and downwardly on the piston housing 58. The upper portion 66a of the cavity 66 is sized to receive the upper end of the piston 56.

The temperature-sensitive wax 60 expands and contracts in response to changes in the temperature of the water flowing through the valve 10. The thermally-induced expansion and contraction of the wax 60 cause the plug 50 to move between its upper and lower positions, and thereby cause the flow rate of water through the valve 10 to vary between the first and second flow rates. Thus, as explained in detail below, the operation of the valve 10 can be controlled by choosing a particular wax 60 that expands and contracts in a manner that results in movement of the plug 50 between its upper and lower positions at a desired temperature, or range of temperatures.

The valve 10 also includes a first, or upper, spring 70, and a second, or lower, spring 72. The first spring 70 is positioned around the plug 50 as shown in FIGS. 2 and 3.

The first spring 70 biases the plug 50 downwardly, toward its lower position. A lower end of the first spring 70 abuts a lip 74 of the plug 50. An upper end of the first spring 70 is positioned within the cavity 42 in the cap 36.

The second spring 72 biases the actuator 52 upwardly in relation to the cap 36 and the housing 20. The second spring 72 is positioned around the cylinder 54 of the actuator 52 as shown in FIGS. 2 and 3. An upper end of the second spring 72 abuts a lip 82 of the cylinder 54. The lip 82 is best shown in FIGS. 5 and 6. A lower end of the second spring abuts a lip 84 formed on the second portion 24 of the body 21 of the housing 20. The spring constant, i.e., spring rate, of the second spring 72 is preferably greater than that of the first spring 70.

Figure 8:
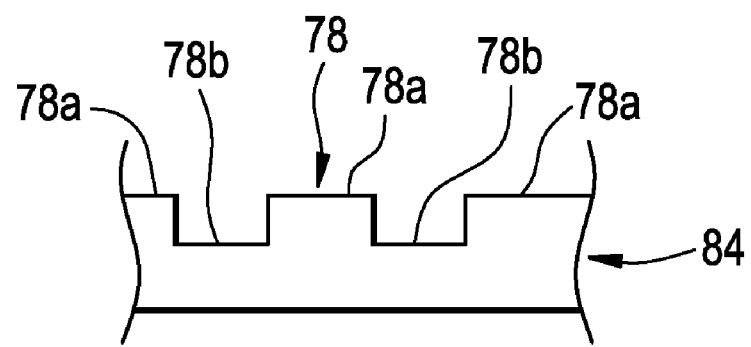
FIG. 8 is a side view of the area designated "D" in FIG. 4.
Figure 9:
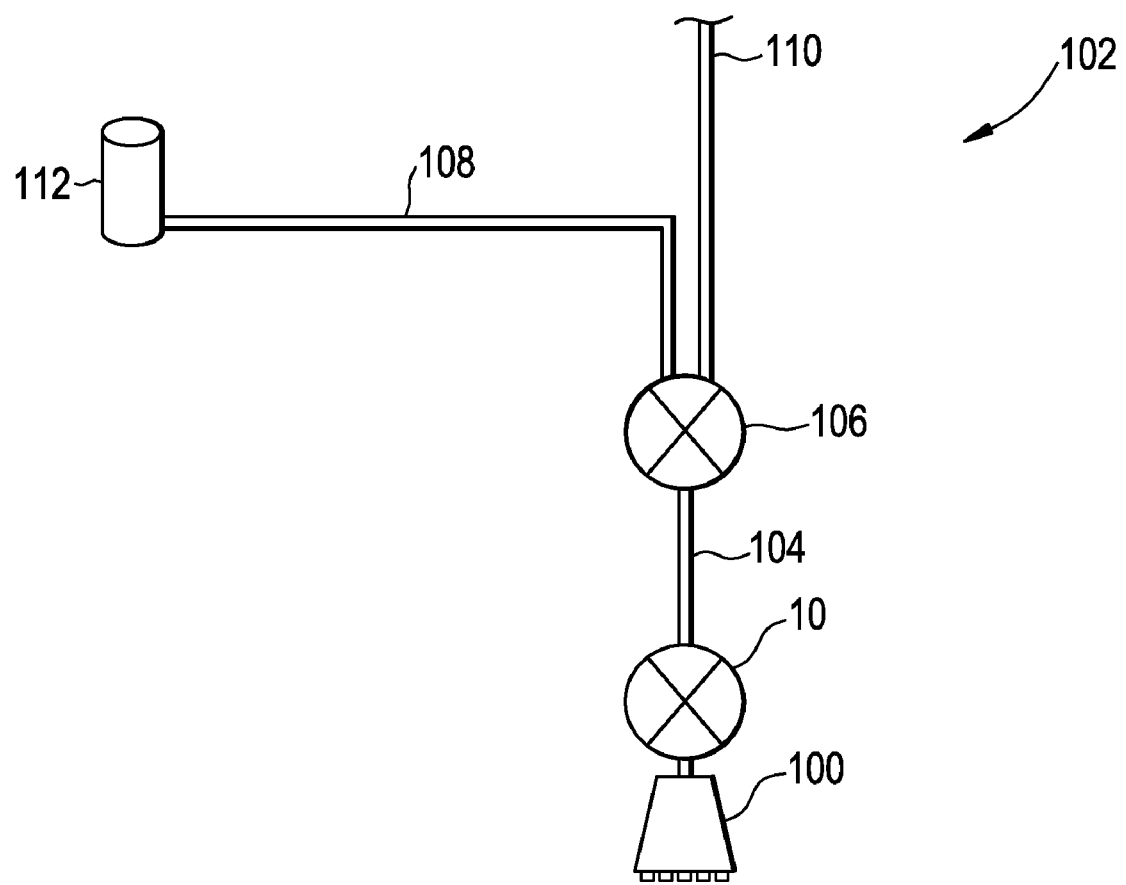
FIG. 9 is a schematic depiction of a shower that incorporates with valve shown in FIGS. 1-8.

The lip 84 has alternating high points 78a and low points 78b formed thereon, as shown in FIG. 8. The lower end of the second spring 72 abuts the high points 78a, but not the low points 78b. This arrangement enables water to flow past the lower end of the second spring 72.

Figure 7:
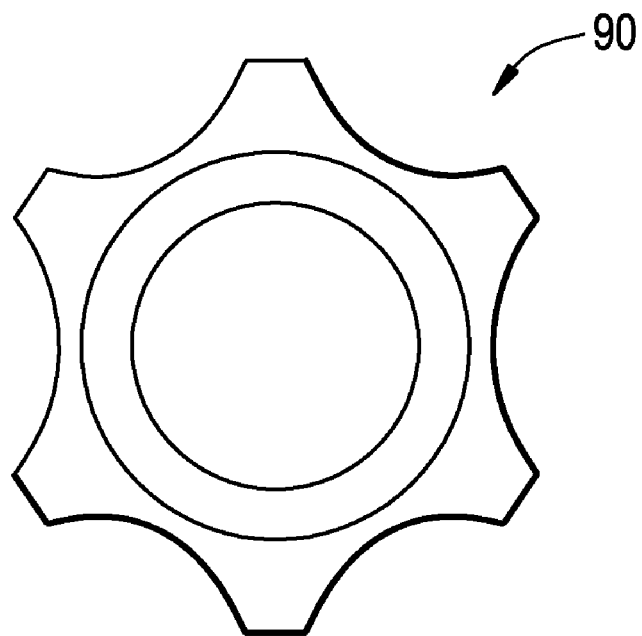
FIG. 7 is a bottom view of a centering disk of the valve shown in FIGS. 1-6.

The valve 10 further comprises a centering disk 90. The centering disk 90 is positioned around the piston housing 58, as shown in FIGS. 5 and 6. The centering disk 90 can be star shaped as shown in FIG. 7, to permit water to pass therethrough. The centering disk 90 can have other shapes in alternative embodiments. The centering disk 90 helps to center the actuator 52 within the cavity 48 of the body 21.

FIG. 2 depicts the water flow path through the valve 10 when the temperature of the water is below the exemplary predetermined value of 80° F. The water flow path is denoted by the arrows 92 in the figures. The thermally-sensitive wax 60 is solid, and has a relatively low volume when the temperature of the wax is below about 80° F. In particular, the volume of the solid wax 60 is less than the combined volume of the cavity 62 within the cylinder 54, the opening 64 in the spacer plate 59, and the lowermost portion of the passage 61 within the piston housing 58. The wax 60 therefore does not exert a substantial force against the piston 56, and the plug 50 is maintained in its lower position by the downward bias of the first spring 70 when the temperature of the wax is below about 80° F.

The plug 50 does not cover the first hole 40 in the cap 36 when the plug 50 is in its lower position, as shown in FIG. 2. Thus, relatively cold water entering the valve 10 from the water supply pipe 104 can flow through the first hole 40 and the second holes 44 so that the total water flow rate through the valve 10 is at its relatively high value (about 4-5 gpm in the exemplary embodiment disclosed herein).

The water passing through the valve 10 flows over the cylinder 54 that holds the wax 60. The temperature of the wax 60 thus changes with, and is approximately equal to the temperature of the water passing through the valve 10.

The wax 60 liquefies and expands as its temperature increases. In particular the wax 60 begins to melt or liquefy as its temperature approaches the predetermined value of about 80° F., and eventually reaches a liquid state as its temperature continues to increase. The volume of the wax 60 in its liquid state is greater than its volume in the solid state. The wax 60 therefore expands as it temperature approaches and exceeds about 80° F.

The cylinder 54 and the spacer plate 59 restrain the wax 60 within the cavity 62 as the wax 60 begins to liquefy and expand. The wax 60 thus expands upwardly, into the passage 61 within the piston housing 66, by way of the opening 64 in the spacer plate 59. The expanding wax 60 exerts an upward force on the piston 56. This force moves the piston 56 and the plug 50 upward, against the bias of the first spring 70, as shown in FIG. 3. The spring rate of the second spring 72 is greater than that of the first spring 70, as noted above. This arrangement permits the first spring 70 to deflect and thereby facilitate upward movement of the piston 56 and the plug 50, while the second spring 72 does not substantially deflect and thereby restrains the cylinder 54 and the piston housing 58 from substantial downward movement.

The characteristics the wax 60 and the configuration of the actuator 52 are chosen so that the volume of the wax 60 is sufficient to urge the plug 50 into its upper position when the wax 60 is completely liquefied. The plug 50 contacts the cap 36 of the housing 20, and blocks the first hole 40 in the cap 36 when the plug 50 is in its upper position. The total flow through the valve 10 therefore is limited to the aggregate flow through the second orifices 44 when the temperature of the water flowing through the valve 10 is relatively high, i.e., at and above some value in excess of about 80° F. The actuator 50 thus restricts the total flow of water through the valve 10 to a relatively low value when the water temperature is relatively high. Moreover, the desired temperature at and above which the restriction occurs can be chosen by selecting a wax 60 that reaches a completely liquid state at approximately the desired temperature.

Permitting the plug 50 and the actuator 52 to "float" on two opposing springs, i.e., the first spring 70 and the second spring 72, can eliminate the need to precisely position the plug 50 and the actuator 52 within the cavity 48. In particular, suspending the bottom of the actuator 52 from the second spring 72 permits the wax 60 to continue its expansion after the plug 50 has contacted the cap 36 of the housing 20. The second spring 72 facilitates further expansion of the wax 60 by permitting the cylinder 54 and the piston housing 58 to move downward as the wax 60 expands and the plug 50 and the piston 56 remain stationary in relation to the cap 36. The ability of the cylinder 54 and the piston housing 58 to move downward in this manner can help to prevent the expanding wax 60 from exerting excessive and potentially harmful stresses on the cap 36, plug 50, and actuator 52; such stresses could otherwise occur if the plug 50 and actuator 52 were positioned within the cavity 48 such that the plug 50 reached the end of its travel before the wax 60 was completely expended, and the bottom of the actuator 52 was restrained from downward movement in relation to the cap 36.

The second orifices 44, as discussed above, can be sized so that the aggregate flow rate therethrough is about equal to the desired flow rate of the shower head 100 under normal operating conditions, e.g., 2.2 gpm at 80 psi. The valve 10, by permitting the flow rate therethrough to be higher than this value while the water is relatively cold, permits the cold water in the hot water supply pipe 108 to be purged in less time than would otherwise be possible, while maintaining the relatively low flow exemplary rate of 2.2 gpm to the shower head 100 under normal operating conditions. The use of the valve 10 can thus help to alleviate inconvenient delays between the point at which the shower 102 is turned on, and the point at which the water flowing from the shower head 100 reaches a comfortable temperature.

The plug 50 can return to its lower position, and flow through the first hole 40 can resume as the thermally-sensitive wax 60 cools. In particular, the liquid wax 60 begins to return to its solid state as the wax 60 cools and approaches about 80° F. This can occur, for example, after the shower 102 is turned off and the wax 60 is no longer heated by relatively warm water flowing through the shower head 100. The contraction of the wax 60 as it returns to a solid state permits the plug 50 to return to its lower position in response to the bias of the first spring 70. The plug 50, upon reaching its lower position, no longer blocks the first hole 40 in the cap 36. The flow rate of water through the valve 10 can thus return to the relatively high exemplary value of about 4-5 gpm, representing the combined flow rate through the first hole 40 and the second holes 44.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, can make numerous modifications to the invention as described herein, and changes may be made without departing from the scope and spirit of the invention as defined by the appended claims.

For example, the use of an actuator 50 comprising a thermally-sensitive wax 60 is disclosed for exemplary purposes only. Other types of actuators, such as actuators that utilize a coil formed from a shape memory metal alloy or a bimetallic material in lieu of thermally-sensitive wax, can be used in the alternative.

Moreover, the positions of the plug 50, the actuator 52, and the first and second springs 70, 72 in relation to the housing 20 can be different than those disclosed herein in alternative embodiments. For example, the plug 50, the actuator 52, and the first and second springs 70, 72 can be positioned entirely within the first portion 22 of the housing 20 in alternative embodiments. Moreover, other alternative embodiments of the valve 10 can be incorporated into a showerhead. In one such embodiment, the valve can be integrated with the rest of the showerhead so that the housing of the showerhead functions as a housing for the valve 10.

What is claimed is:

1. A valve, comprising:
   a housing defining a flow path for a liquid between a fluid inlet and a fluid outlet, the housing having a first and a second hole formed therein, the first and second holes forming part of the flow path;
   a plug movable in relation to the housing between a first position in which the plug blocks the first hole to create a normal operational flow rate of liquid between the fluid inlet and the fluid outlet and a second position in which the plug does not block the first hole to create a purging flow rate of liquid between the fluid inlet and the fluid outlet, the purging flow rate larger than the normal operational flow rate; and an actuator that moves the plug from the second position to the first position when the temperature of the fluid is at or above a predetermined level.

2. The valve of claim 1, wherein: the actuator comprises a piston and a temperature-sensitive wax; the temperature-sensitive wax expands in response to increases in the temperature of the liquid; and the expansion of the temperature-sensitive wax urges the piston toward the plug so that the piston urges the plug toward the second position.

3. The valve of claim 2, wherein the actuator is a linear actuator extending between first and second ends, wherein each end is biased relative to the housing.

4. The valve of claim 2, wherein the actuator is a linear actuator extending between first and second ends, wherein each end is biased relative to the housing.

5. The valve of claim 1, further comprising a spring that biases the plug toward the second position.

6. The valve of claim 1, wherein the housing has a plurality of second holes formed therein, and the second holes are positioned radially outward of the first hole.

7. The valve of claim 6, wherein the housing comprises a body and a cap mounted on the body; and the first and second holes are formed in the cap.

8. The valve of claim 7, wherein the piston urges the plug into the cap when the plug is in the first position.

9. The valve of claim 1, wherein the housing defines a cavity in fluid communication with the first and second holes; the actuator is positioned within the cavity, and the plug prevents flow of the fluid from the first hole to the cavity when the plug is in the first position.

10. The valve of claim 1, wherein the predetermined temperature value is at a temperature lower than a use temperature.

11. The valve of claim 1, wherein the predetermined temperature value is at about 80° F.

12. The valve of claim 1, wherein the normal operational flow rate is about 2.2 gallons per minute and the purging flow rate is about 4-5 gallons per minute.

13. A valve for regulating the flow rate of a liquid to a fixture between a first flow rate suitable for operating the fixture, and a second flow rate higher than the first flow rate, the valve comprising:

a housing having a first and a second flow path for the liquid formed therein, wherein the flow rate of the liquid through the first flow path is equal to the first flow rate, and the combined flow rate of the liquid through the first and second flow paths is equal to the second flow rate;

a blocking member movable between a first position wherein the blocking member prevents substantial flow through the second flow path, and a second position; and an actuator that moves the blocking member from the second position to the first position when the temperature of the fluid is at or above a predetermined level.

14. The valve of claim 13, wherein the housing has a first and a second hole formed therein; the first flow path is defined by first hole; and the second flow path is defined by the second hole.

15. The valve of claim 14, wherein the blocking member comprises a plug.

16. The valve of claim 15, wherein the actuator comprises a piston and a temperature-sensitive wax; the temperature-sensitive wax expands in response to increases in the temperature of the liquid; and the expansion of the temperature-sensitive wax urges the piston toward the plug so that the piston urges the plug toward the second position.

17. The valve of claim 14, wherein the housing comprises a body and a cap mounted on the body; and the first and second holes are formed in the cap.

18. The valve of claim 13, wherein the actuator moves the blocking member from the second position to the first position when the temperature of the liquid exceeds a predetermined value.

19. The valve of claim 13, wherein the predetermined temperature value is at a temperature lower than a use temperature.

20. The valve of claim 13, wherein the predetermined temperature value is at about 80° F.

21. The valve of claim 13, wherein the normal operational flow rate is about 2.2 gallons per minute and the purging flow rate is about 4-5 gallons per minute.

22. A method, comprising:

providing a valve in fluid communication with (i) a fixture, (ii) a source of heated water for the fixture, and (iii) piping that forms a flow path between the source of heated water and the fixture, the valve permitting water to pass therethrough at a first flow rate when the temperature of the water is below a predetermined value, and the valve limiting the flow rate of the water therethrough to a second flow rate when the temperature of the water is at or above the predetermined value, the second flow rate being less than the first flow rate and being suitable for operating the fixture; and flowing water through the valve, the piping, and the fixture, wherein flowing water through the valve, the piping, and the fixture comprises purging water having a temperature below the predetermined value from the piping by way of the valve and the fixture at the first flow rate.

23. The method of claim 22, wherein flowing water through the valve, the piping, and the fixture further comprises flowing water having a temperature above the predetermined value through the valve, the piping, and the fixture at the second flow rate after purging the water having a temperature below the predetermined value from the piping.

24. The method of claim 22, wherein providing a valve in fluid communication with a fixture comprises providing a valve in fluid communication with a shower head.

25. A method, comprising:

providing a valve in fluid communication with a source of heated water and a fixture, the valve having a first and a second flow path formed therein;

flowing water through the first and second flow paths when the temperature of the water is below a predetermined value; and flowing water through the first flow path and not the second flow path at a flow rate sufficient for operating the fixture when the temperature of the water is at or above the predetermined value, wherein flowing water through the first and second flow paths when the temperature of the water is below a predetermined value comprises purging water having a temperature below the predetermined value from piping upstream of the valve by way of the fixture.

26. The valve of claim 25, wherein providing a valve in fluid communication with a source of heater water and a fixture comprises providing a valve in fluid communication with the source of heated water and a shower head.

* * * * *